(12) United States Patent
Hsu

(10) Patent No.: US 12,468,213 B2
(45) Date of Patent: Nov. 11, 2025

(54) PROJECTOR

(71) Applicant: Coretronic Corporation, Hsin-Chu (TW)

(72) Inventor: En-Huai Hsu, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 533 days.

(21) Appl. No.: 18/085,569

(22) Filed: Dec. 20, 2022

(65) Prior Publication Data

US 2023/0194966 A1 Jun. 22, 2023

(30) Foreign Application Priority Data

Dec. 22, 2021 (CN) .......................... 202111576748.2

(51) Int. Cl.
*G03B 21/14* (2006.01)
*G03B 21/54* (2006.01)

(52) U.S. Cl.
CPC ........... *G03B 21/145* (2013.01); *G03B 21/54* (2013.01)

(58) Field of Classification Search
CPC ........ G03B 21/14; G03B 21/28; G03B 21/54; G03B 21/142; G03B 21/145; G03B 21/147; H04N 9/315; H04N 9/317; H04N 9/3105; H04N 9/3141; H04N 9/3144; H04N 9/3152; H04N 9/3155; H04N 9/3158; H04N 9/3161; H04N 9/3164
See application file for complete search history.

(56) References Cited

U.S. PATENT DOCUMENTS

| 2005/0068638 | A1 | 3/2005 | Nuno et al. | |
| 2015/0002826 | A1* | 1/2015 | Hashimoto | G03B 11/043 353/88 |
| 2020/0057240 | A1* | 2/2020 | Yu | G03B 21/145 |
| 2020/0336712 | A1* | 10/2020 | Shi | H04N 9/315 |

FOREIGN PATENT DOCUMENTS

| CN | 102062998 | 5/2011 |
| CN | 102360154 | 2/2012 |
| CN | 102375308 | 3/2012 |
| CN | 202330990 | 7/2012 |

(Continued)

OTHER PUBLICATIONS

"Office Action of China Counterpart Application", issued on May 23, 2025, p. 1-p. 10.

*Primary Examiner* — Sultan Chowdhury
(74) *Attorney, Agent, or Firm* — JCIPRNET

(57) ABSTRACT

A projector includes a base, an optical engine assembly, a lens assembly, a connector, and a buffer. The base includes a primary plate body and a first connection part connected to the primary plate body. The optical engine assembly is configured to provide an image beam. The lens assembly is arranged above the base and located on a transmission path of the image beam. The connector includes a first fixing part and a second connection part connected to the first fixing part. The first fixing part is fixed to the lens assembly, one of the first connection part and the second connection part is a slot, and the other is movably inserted into the slot. The buffer is arranged in the slot, and the first connection part is connected to the second connection part through the buffer. The projector may effectively prevent lens vibration.

14 Claims, 8 Drawing Sheets

(56) References Cited

FOREIGN PATENT DOCUMENTS

| | | |
|---|---|---|
| CN | 104267564 | 1/2015 |
| CN | 205539886 | 8/2016 |
| CN | 107111099 | 8/2017 |
| CN | 208737188 | 4/2019 |
| CN | 110780515 | 2/2020 |
| CN | 111487838 | 8/2020 |
| CN | 214795548 | 11/2021 |
| CN | 214846196 | 11/2021 |
| JP | 2008139725 | 6/2008 |
| KR | 20170058193 | 5/2017 |
| TW | 200909983 | 3/2009 |

* cited by examiner

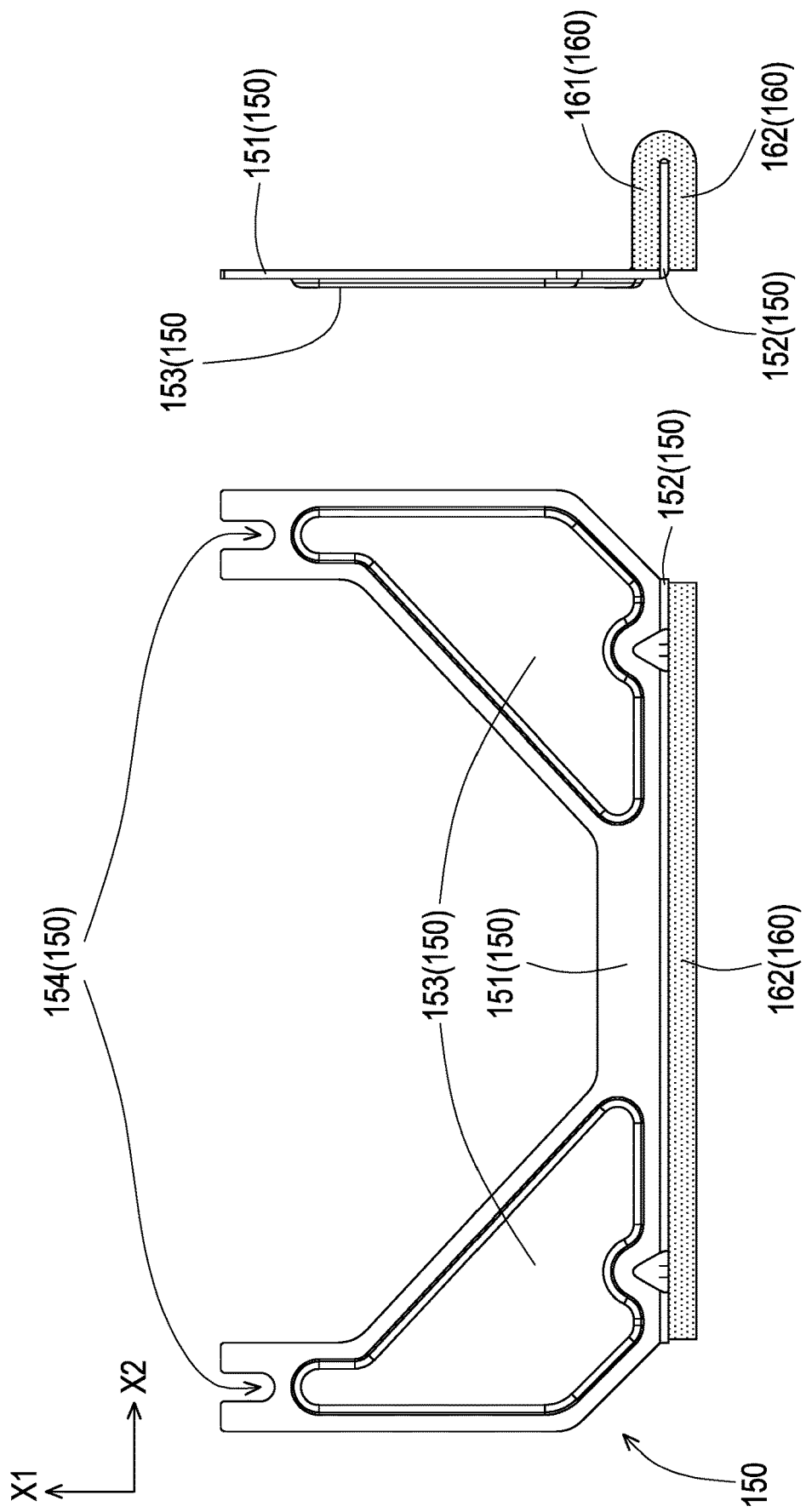

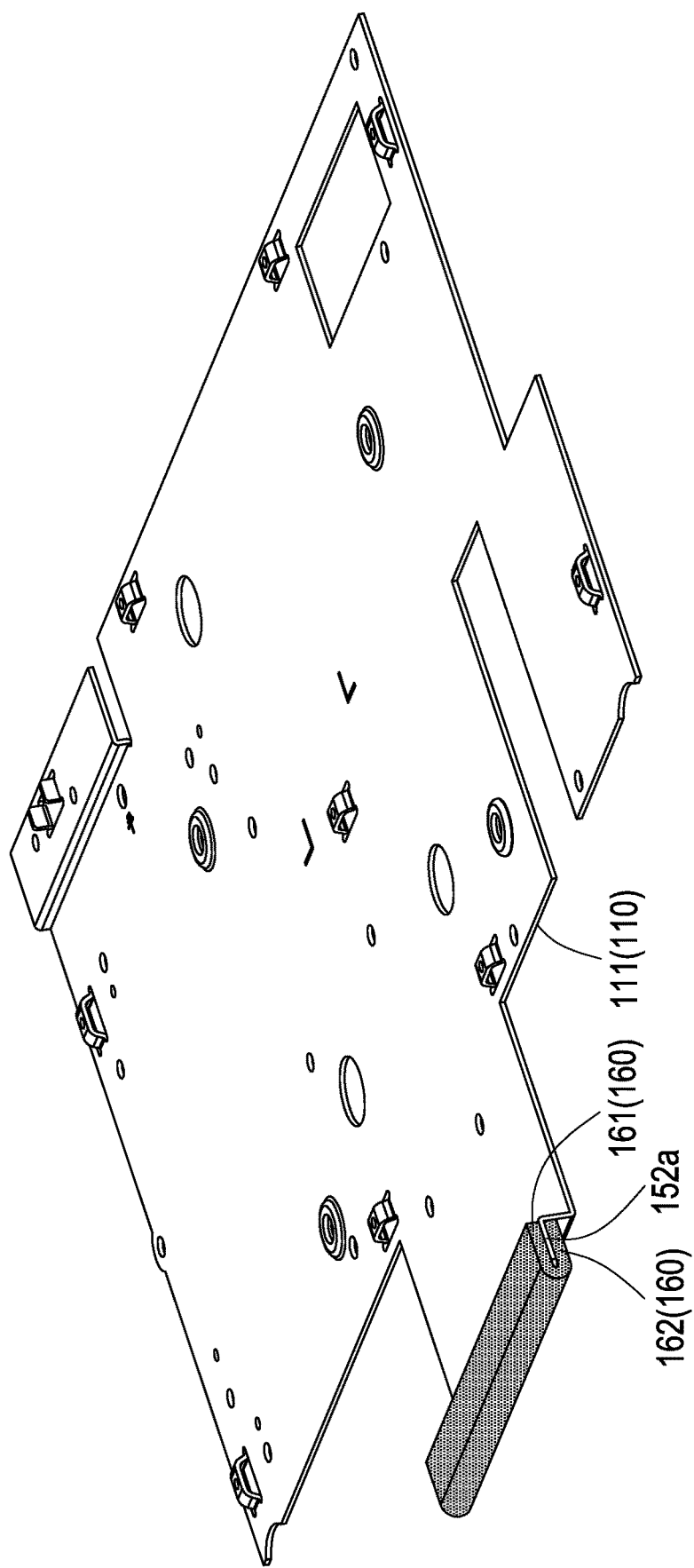

PROJECTOR

CROSS-REFERENCE TO RELATED APPLICATION

This application claims the priority benefit of China application serial no. 202111576748.2, filed on Dec. 22, 2021. The entirety of the above-mentioned patent application is hereby incorporated by reference herein and made a part of this specification.

BACKGROUND OF THE INVENTION

1. Field of the Invention

The invention relates to an optical projection device and particularly relates to a projector.

2. Description of Related Art

Existing optical projection devices, such as single beam projectors, are not only able to project high-quality images but also equipped with internal speakers to output sound. However, high-power speakers tend to resonate when playing heavy bass, which may cause projector lenses to be shaken and further lead to a decline in imaging quality of the projector and poor user experience. In addition, if the projectors adopt ultra-short throw (UST) lenses, the short projection distance and the addition of reflector modules may increase sensitivity to vibrations. Even if the shake of the lenses is subtle, the resultant imaging quality is significantly affected. Therefore, how to prevent lens vibration from affecting the imaging quality is an imminent problem to be solved in the pertinent art.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention was acknowledged by a person of ordinary skill in the art.

SUMMARY OF THE INVENTION

One or more embodiments of the invention provide a projector capable of effectively preventing lens vibration.

Other objectives and advantages of the invention may be further understood from the technical features disclosed in the invention.

In order to achieve one, some, or all of the aforementioned objectives or other objectives, an embodiment of the invention provides a projector that includes a base, an optical engine assembly, a lens assembly, a connector, and a buffer. The base includes a primary plate body and a first connection part connected to the primary plate body. The optical engine assembly is configured to provide an image beam. The lens assembly is arranged above the base and located on a transmission path of the image beam. The connector includes a first fixing part and a second connection part connected to the first fixing part. Here, the first fixing part is fixed to the lens assembly, one of the first connection part and the second connection part is a slot, and the other of the first connection part and the second connection part is movably inserted into the slot. The buffer is arranged in the slot, and the first connection part is connected to the second connection part through the buffer.

In view of the above, the connector includes the first fixing part fixed to the lens assembly and the second connection part connected to the first connection part located at the base, and the buffer is arranged between the first connection part and the second connection part. Thereby, vibrations received by the lens assembly may be sequentially transmitted to the first fixing part and the second connection part and then absorbed by the buffer in the slot. Accordingly, the lens assembly is able to stay steady without being shaken during a process of projecting images. As a result, the projector provided in one or more embodiments of the invention ensures favorable imaging quality and achieves a pleasant user experience.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 4A is a schematic front view illustrating a connector and a buffer in the projector depicted in FIG. 1.

FIG. 4B is a schematic side view illustrating a connector and a buffer in the projector depicted in FIG. 1.

FIG. 6B is a schematic view illustrating a base and a buffer in the projector depicted in FIG. 6A.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
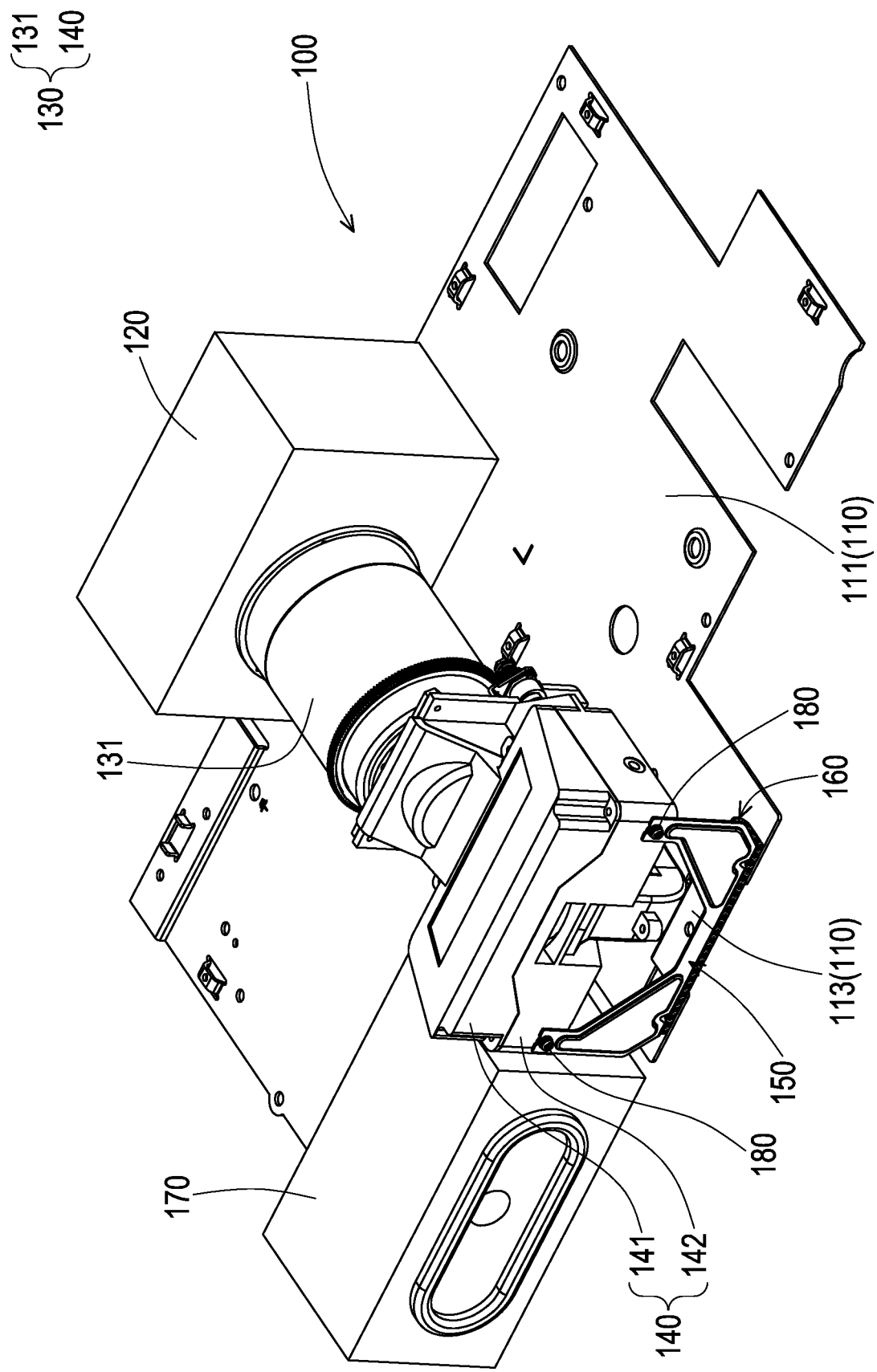
FIG. 1 is a schematic view illustrating a projector according to an embodiment of the invention.
Figure 2:
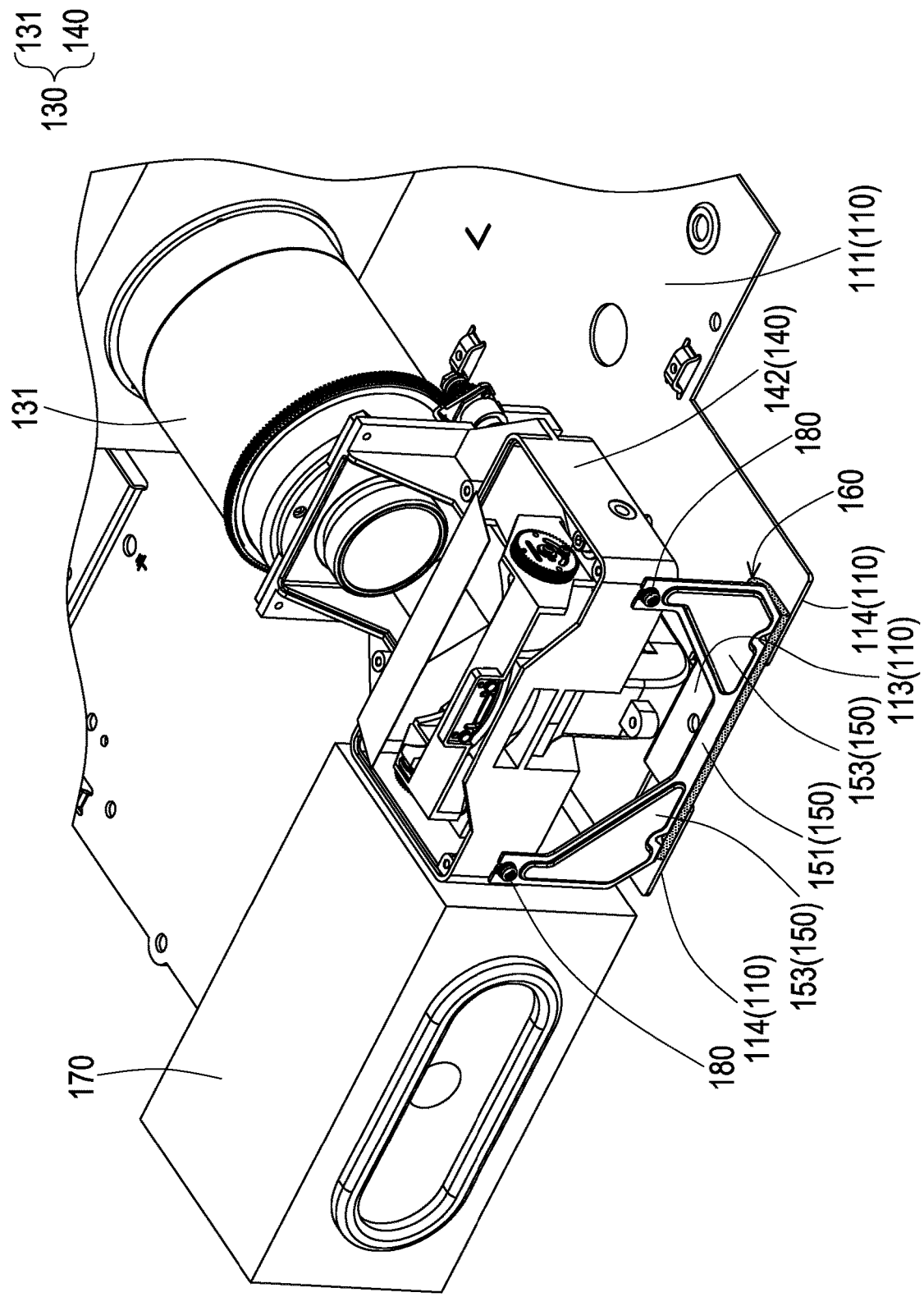
FIG. 2 is a schematic enlarged view illustrating the projector of FIG. 1 where an upper housing of a lens assembly is removed.
Figure 3A:
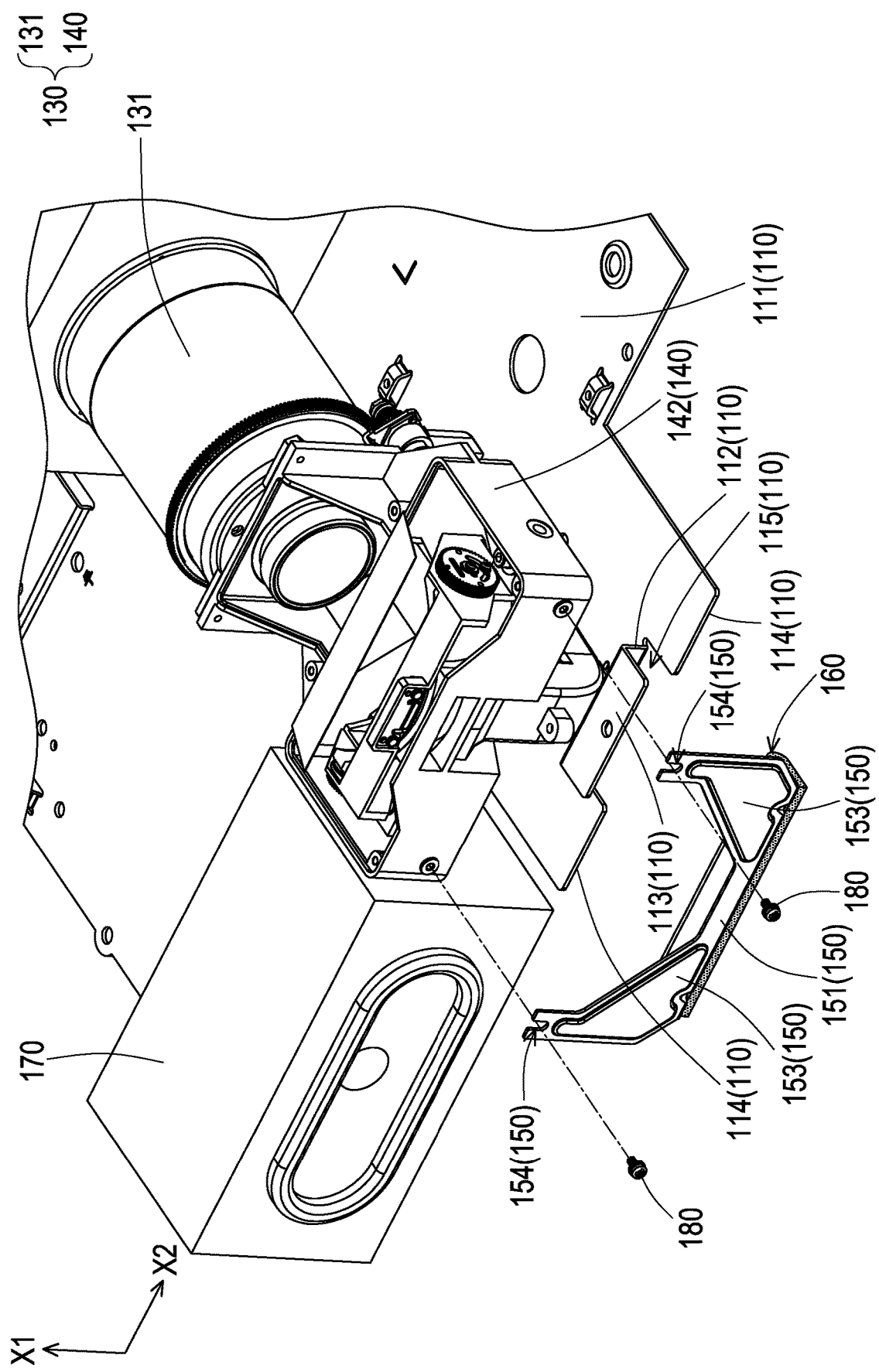
FIG. 3A is a schematic view illustrating the projector of FIG. 1 where a connector is not assembled yet.
Figure 3B:
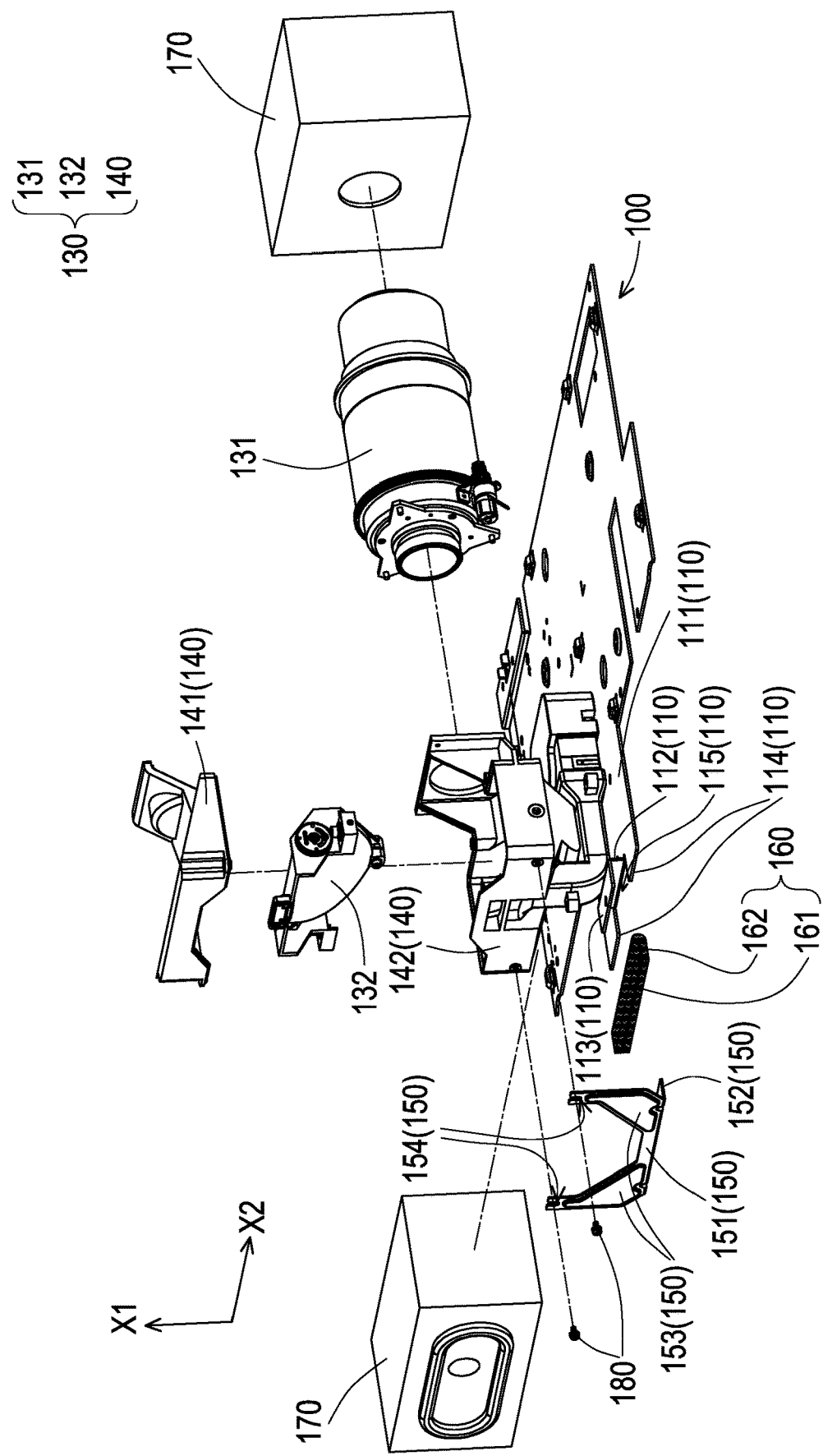
FIG. 3B is a schematic exploded view illustrating the projector depicted in FIG.

FIG. 1 is a schematic view illustrating a projector according to an embodiment of the invention. FIG. 2 is a schematic enlarged view illustrating the projector of FIG. 1 where an upper housing of a lens assembly is removed. FIG. 3A is a schematic view illustrating the projector of FIG. 1 where a connector is not assembled yet. FIG. 3B is a schematic exploded view illustrating the projector depicted in FIG. 1. To clearly show the internal structure of the lens assembly, the upper housing of the lens assembly is hidden in FIG. 2 and FIG. 3A.

With reference to FIG. 1 to FIG. 3B, a projector 100 provided in the present embodiment is a UST projector, for instance, while the way to apply the projector 100 should not be construed as a limitation to the invention. The projector 100 includes a base 110, an optical engine assembly 120, a lens assembly 130, a connector 150, and a buffer 160. The base 110 includes a primary plate body 111 and a first connection part connected to the primary plate body 111. The connector 150 includes a first fixing part 151 and a second connection part connected to the first fixing part 151, wherein the first fixing part 151 is fixed to the lens assembly 130. The buffer 160 is arranged in a slot, and the first connection part is connected to the second connection part through the buffer 160. In the present embodiment, the projector 100 may be placed on a surface of an object, e.g., on a surface of a table; in other embodiments, the projector 100 may be suspended from a ceiling or surfaces of other objects.

Specifically, the optical engine assembly 120 and the lens assembly 130 provided in this embodiment are arranged above the primary plate body 111 of the base 110. The optical engine assembly 120 includes devices such as a light source (not shown) and a light valve (not shown), and the optical engine assembly 120 is configured to provide an image beam (not shown) to the lens assembly 130. The lens assembly 130 is located on a transmission path of the image beam.

The lens assembly 130 includes a lens barrel 131, a housing 140, and a reflector 132 located in the housing 140 (FIG. 3B). The lens assembly 130 is connected to the optical engine assembly 120 through the lens barrel 131, for instance, so that the lens assembly 130 has a structure similar to that of a cantilever. The lens assembly 130 is located at a front end at the housing 140, and the front end of the lens assembly 130 is prone to shaking. In other embodiments, the lens assembly 130 may be selectively connected or not connected to the optical engine assembly 120, and the projector 100 is further equipped with a fixing frame (not shown) to fix the lens barrel 131 of the lens assembly 130. The lens assembly 130 is located at the front end of the housing 140 and thus is prone to shaking.

As shown in FIG. 3B, the housing 140 includes an upper housing 141 and a lower housing 142, and the upper housing 141 and the lower housing 142 cover the reflector 132 and a portion of the lens barrel 131 (e.g., a front end of the lens barrel 131). The reflector 132 is arranged in the lower housing 142, and the reflector 132 is configured to reflect the image beam passing through the lens barrel 131. The image beam projected by the optical engine assembly 120 is sequentially transmitted to the lens barrel 131 and the reflector 132, is reflected by the reflector 132, and leaves the lens assembly 130 from the upper housing 141.

In addition, the projector 100 provided in this embodiment is equipped with at least one speaker 170. The at least one speaker 170 is located beside the housing 140 of the lens assembly 130, while the location where the at least one speaker 170 is arranged is not limited to what is described herein. The number of at least one speaker 170 may be one or plural.

Note that the at least one speaker 170 may easily cause resonance of internal devices of the projector 100 when playing heavy bass. In the present embodiment, the projector 100 has a special arrangement to prevent the imaging quality from being affected due to the resonance of the lens assembly 130 and the at least one speaker 170. Further explanation will be provided hereinafter.

As shown in FIG. 3A, a first connection part of the base 110 provided in this embodiment includes at least one first baffle 113, at least one second baffle 114, and a slot 115 formed between the at least one first baffle 113 and the at least one second baffle 114.

The at least one first baffle 113 and the at least one second baffle 114 extend from the primary plate body 111. Specifically, the base 110 further includes a connection plate 112 which is bent and extended upward in a direction from the primary plate body 111 to the lens assembly 130 and bent and connected to the at least one first baffle 113. The at least one second baffle 114 directly extends from the primary plate body 111.

The at least one first baffle 113 and the at least one second baffle 114 are arranged along a first direction X1 (e.g., arranged in an up and down direction in FIG. 3A), and the first direction X1 is, for instance, parallel to the normal direction of the primary plate body 111. For instance, the at least one first baffle 113 is located above the first direction X1, and the at least one second baffle 114 is located below the first direction X1.

In the present embodiment, projections of the at least one first baffle 113 and the at least one second baffle 114 on a plane where the primary plate body 111 is located are not overlapped. Therefore, the at least one first baffle 113 and the at least one second baffle 114 may be stamped with use of one metal member and bent out of the primary plate body 111, the at least one first baffle 113, and the at least one second baffle 114.

Certainly, in other embodiments, the way to form the primary plate body 111, the at least one first baffle 113, and the at least one second baffle 114 is not limited to what is described herein. The primary plate body 111, the at least one first baffle 113, and the at least one second baffle 114 may also be manufactured separately and then fixed together. The projections of the at least one first baffle 113 and the at least one second baffle 114 on the plane where the primary plate body 111 is located may also be overlapped partly or entirely.

In addition, in the present embodiment, the number of the at least one first baffle 113 is one, the number of the at least one second baffle 114 is two, and the two projections of the second baffles 114 on the plane where the primary plate body 111 is located are on both sides of the projection of the at least one first baffle 113 on the plane where the primary plate body 111 is located, so as to provide stable support for the buffer 160 and the connector 150 which will be subsequently inserted into the slot 115. Certainly, the number of the at least one first baffle 113 and the number of the at least one second baffle 114 are not limited to what is described above, given that the slot 115 is formed.

In addition, as shown in FIG. 3A, in the present embodiment, the at least one first baffle 113 and the at least one second baffle 114 are parallel to the primary plate body 111. The connection plate 112 is perpendicular to the primary plate body 111, the at least one first baffle 113, and the at least one second baffle 114. However, in other embodiments, the at least one first baffle 113 and the at least one second baffle 114 may not be parallel to the primary plate body 111, and the connection plate 112 may also be inclinedly arranged at the primary plate body 111.

Moreover, in the present embodiment, the at least one second baffle 114 and the primary plate body 111 are located on the same plane, whereas the relative locations of the at least one second baffle 114 and the primary plate body 111 are not limited to what is described herein. In other embodiments, the at least one second baffle 114 and the primary plate body 111 may be located on different planes; alternatively, the at least one first baffle 113 and the primary plate body 111 may be located on the same plane.

For instance, the at least one second baffle 114 may be away from the primary plate body 111 and close to the lens assembly 130 in the first direction X1. As long as a distance between the plane where the at least one first baffle 113 is located and the plane where the primary plate body 111 is located is different from a distance between the plane where the at least one second baffle 114 is located and the plane where the primary plate body 111 is located, the slot 115 is able to be formed between the at least one first baffle 113 and the at least one second baffle 114.

As shown in FIG. 3A, the at least one first baffle 113, the connection plate 112, and the at least one second baffle 114 collectively surround and define the slot 115. In the present embodiment, the slot 115 is away from the optical engine assembly 120 (FIG. 1) and is close to the reflector 132 of the lens assembly 130 (FIG. 3B). In other words, the slot 115 is close to the front end of the lens assembly 130. In addition, in the present embodiment, the at least one speaker 170 is close to the front end of the lens assembly 130 and located beside the slot 115.

In the present embodiment, the connector 150 is fixed to the lens assembly 130, and one end of the connector 150 is arranged in the slot 115. Thereby, the at least one first baffle 113 and the at least one second baffle 114 restrict the movement of the connector 150 in the first direction X1, so that the lens assembly 130 may be stably arranged at the base 110 in the first direction X1.

Specifically, in the present embodiment, the lens assembly 130 has the structure similar to that of the cantilever, and thus the front end of the lens assembly 130 vibrates significantly when it is affected by the resonance of the at least one speaker 170, especially the vibration in the first direction X1. Therefore, the slot 115 configured to fix the lens assembly 130 is arranged close to the front end of the lens assembly 130. The connector 150 is also correspondingly arranged (fixed) at the front end of the lens assembly 130 and is located close to the reflector 132 (FIG. 3B) and away from the lens barrel 131. The lens assembly 130 is connected to the base 110 through the connector 150, which may effectively reduce the vibration at the front end of the lens assembly 130 and may allow the reflector 132 (FIG. 3B) to stably reflect and affect the light beam. Certainly, in other embodiments, the slot 115 may also be arranged at other locations below the lens assembly 130, and the location of the slot 115 should not be limited to what is illustrated in the drawings.

In addition, in the present embodiment, the slot 115 extends along a second direction X2 (a direction from upper left to lower right in FIG. 3A), and the first direction X1 and the second direction X2 are perpendicular to each other. Therefore, the connector 150 is movably inserted into the slot 115 along the second direction X2 to facilitate a process of fine-tuning the location of the connector 150 inserted into the slot 115 in the second direction X2 according to the location of the lens assembly 130 in the second direction X2.

FIG. 4A is a schematic front view illustrating a connector and a buffer in the projector depicted in FIG. 1. FIG. 4B is a schematic side view illustrating a connector and a buffer in the projector depicted in FIG. 1. Please refer to FIG. 4A and FIG. 4B.

In the present embodiment, the connector 150 includes a first fixing part 151 and a second connection part 152 perpendicular to the first fixing part 151. As shown in FIG. 4B, the first fixing part 151 and the second connection part 152 together constitute an L-like shape; however, the shape of the first fixing part 151 and the second connection part 152 is not limited to what is described herein.

As shown in FIG. 4A and FIG. 4B, the first fixing part 151 may optionally include a reinforced rib 153. The reinforced rib 153 protrudes from a surface of the first fixing part 151 and is configured to increase a structural strength of the first fixing part 151. Users may adjust the shape and the area of the reinforced rib 153 according to actual needs.

The first fixing part 151 further includes at least one elongated hole 154 extending along the first direction X1. In the present embodiment, the first fixing part 151 has two elongated holes 154 which are arranged away from the second connection part 152, for instance. The elongated holes 154 may be U-shaped holes recessed from an edge of the first fixing part 151, while the shape of the elongated holes 154 is not limited to what is described herein.

As shown in FIG. 3A, the elongated holes 154 are configured to allow a fastener 180 (FIG. 3B) to pass through. The fastener 180 passes through the elongated holes 154 of the first fixing part 151 and is fixed to the lower housing 142 of the lens assembly 130. The fastener 180 is, for instance, a screw, but the type of the fastener 180 should not be limited to what is described herein.

The design of the elongated holes 154 allows adjustment of a location where the connector 150 is connected to the lower housing 142 in the first direction X1. Therefore, even though the location of the lens assembly 130 or the location of the connector 150 deviates in the first direction X1 due to assembly or manufacturing tolerances, those who perform the assembly process may also fix in advance (false-fix) the connector 150 and the lower housing 142 and adjust the height of the connector 150 in the first direction X1, so as to allow the second connection part 152 to be inserted into the slot 115 in parallel. The fastener 180 is then applied to fix the first fixing part 151 to the lower housing 142 of the lens assembly 130. In other words, a sectional area of the elongated hole 154 is larger than a sectional area of a screw rod of the fastener 180, so the elongated holes 154 provide a margin for adjusting the location of the connector 150 in the first direction X1.

In addition, a screw nut of the fastener 180 may press against a wall surface of the first fixing part 151 beside the elongated hole 154, and the fastener 180 is fastened to the surface of the lower housing 142 away from the optical engine assembly 120 (FIG. 1). Therefore, the connector 150 may be fixed to the lower housing 142 by the fastener 180. Certainly, the location of the connector 150 fixed to the lower housing 142 is not limited to what is described herein. In other embodiments, the first fixing part 151 may also be fixed to a lower surface of the lower housing 142.

As shown in FIG. 4B, in this embodiment, the buffer 160 covers the second connection part 152. In the present embodiment, the buffer 160 is made of, for instance, foam, rubber, or silicone rubber which may well absorb energy of vibrations, but the material of the buffer 160 is not limited to what is described herein.

The buffer 160 includes a first buffer 161 and a second buffer 162. In the present embodiment, the first buffer 161 and the second buffer 162 are integrally formed. In other embodiments, the first buffer 161 and the second buffer 162 may also be two separate pieces.

Figure 5:
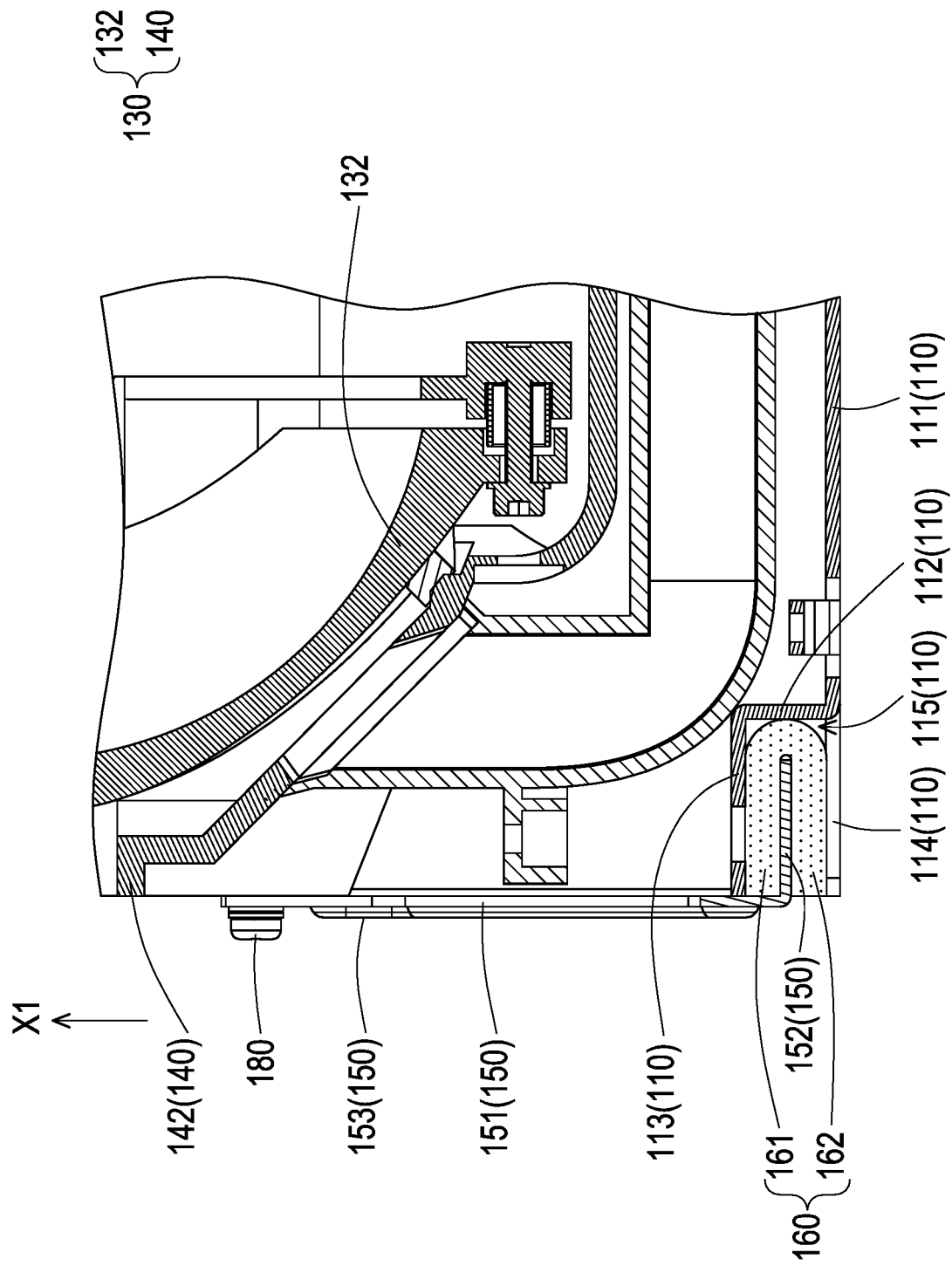
FIG. 5 is a schematic cross-sectional view illustrating a portion of the projector depicted in FIG. 1.

FIG. 5 is a schematic cross-sectional view illustrating a portion of the projector depicted in FIG. 1. With reference to FIG. 5, the first buffer 161 is attached to a surface of the second connection part 152 close to the reflector 132 (an upper surface of the second connection part 152), and the second buffer 162 is attached to a surface of the second connection part 152 away from the reflector 132 (a lower surface of the second connection part 152). The first buffer 161 and the second buffer 162 provided in this embodiment are, for instance, attached to the second connection part 152 by a double-sided tape, but the way to attach the first buffer 161 and the second buffer 162 is not limited to what is described herein.

As shown in FIG. 5, when the second connection part 152 covering the buffer 160 is arranged in the slot 115, the first buffer 161 is arranged between the at least one first baffle 113 and the second connection part 152, and the second buffer 162 is arranged between the at least one second baffle 114 and the second connection part 152. Specifically, projections of the at least one first baffle 113 and the first buffer 161 on the plane where the primary plate body 111 is located are overlapped, and projections of the at least one second baffle 114 and the second buffer 162 on the plane where the primary plate body 111 is located are overlapped. The buffer 160 located in the slot 115 may be barely compressed to reduce the probability that the reflector 132 (FIG. 3B) and the lens barrel 131 (FIG. 3B) cannot focus due to a pressure exerted onto the housing 140 of the lens assembly 130 by the at least one first baffle 113 or the at least one second baffle 114 through the buffer 160 and the connector 150.

In other words, the lens assembly 130 of the projector 100 provided in this embodiment is connected to the first fixing part 151 of the connector 150, the second connection part 152 of the connector 150 and the buffer 160 are collectively inserted into the slot 115 of the base 110, and the buffer 160 is located between the at least one first baffle 113 and the second connection part 152 and between the second connection part 152 and the at least one second baffle 114.

Such an arrangement may allow the front end of the lens assembly 130 to be well fixed to the base 110. Thereby, the lens assembly 130 may be prevented from having a structure similar to that of a cantilever at the housing 140 (fixed to the optical engine assembly 120 merely through the lens barrel 131), and the front end of the lens assembly 130 may not vibrate violently due to the resonance of the at least one speaker 170. Therefore, where the at least one speaker 170 is located may not be construed as a limitation to the invention, and even though the lens assembly 130 is arranged beside the housing 140 (the front end of the lens assembly 130), the imaging quality is not affected.

In addition, the buffer 160 may also effectively absorb the vibration of the lens assembly 130 generated by the resonance of the at least one speaker 170 (FIG. 1). Even if the lens assembly 130 vibrates, the vibrations are sequentially transmitted from the housing 140 to the first fixing part 151 and the second connection part 152 and finally absorbed by the buffer 160 attached to the second connection part 152, thus effectively lessening the shaking of the lens assembly 130.

Besides, the connector 150 has a simple structure, which saves materials and costs, and the connector 150 may be easily assembled into the slot 115. In other words, the projector 100 may achieve good effects with a simple and cost-saving design.

According to actual measurement, even when the projector 100 is suspended from the ceiling, the issue of co-frequency resonance of the lens assembly 130 caused by the vibration of the at least one speaker 170 when the lens assembly 130 approaches the at least one speaker 170, and the image quality achieved by the suspended projector 100 may be the same as that achieved by the projector 100 at a horizontal position.

Figure 6A:
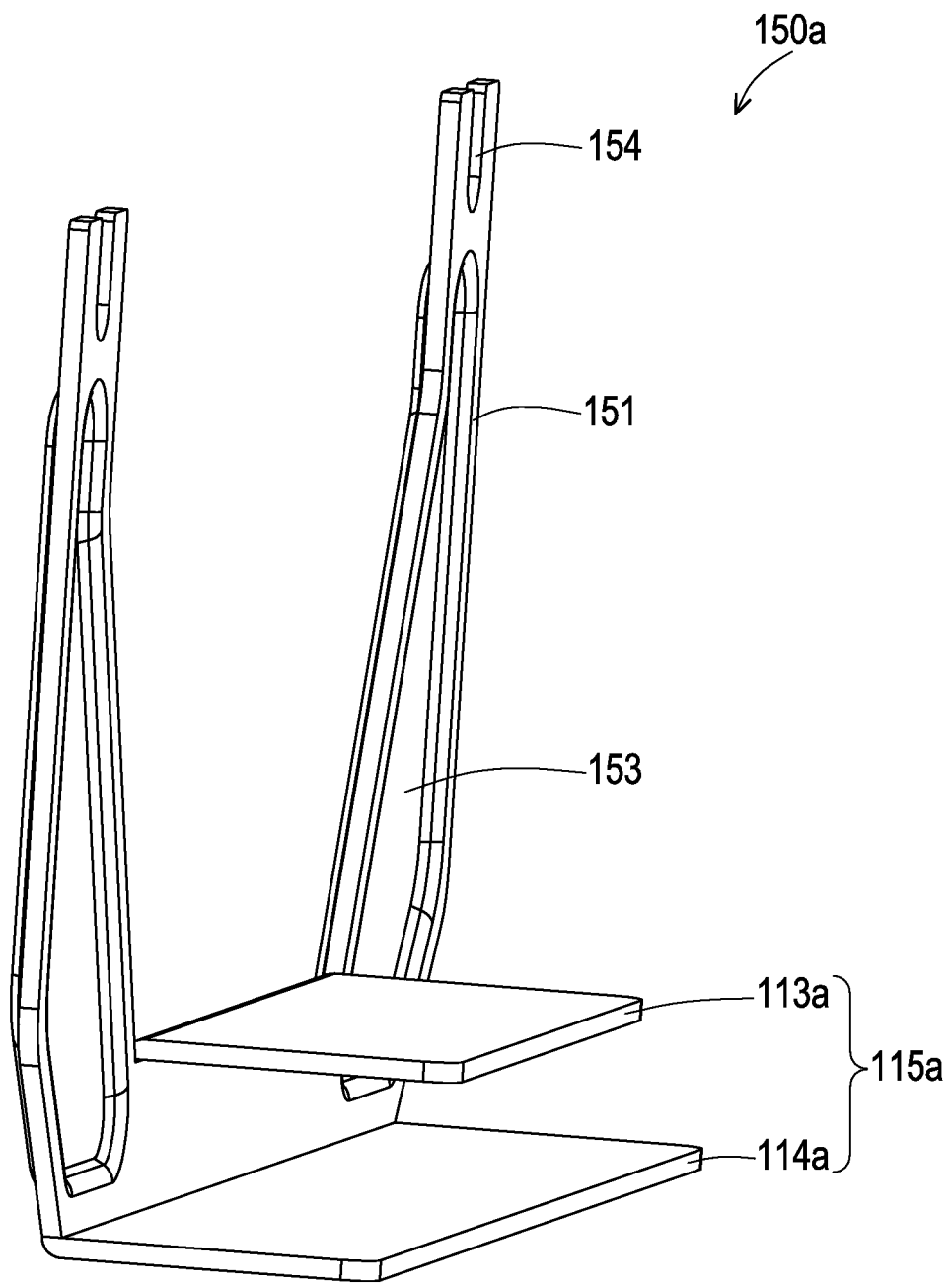
FIG. 6A is a schematic view illustrating a connector of a projector according to another embodiment of the invention.

FIG. 6A is a schematic view illustrating a connector of a projector according to another embodiment of the invention. FIG. 6B is a schematic view illustrating a base and a buffer in the projector depicted in FIG. 6A. With reference to FIG. 6A and FIG. 6B, the difference between the projector provided in this embodiment and the projector 100 depicted in FIG. 1 lies in the components included in the connector and the base. Specifically, a connector 150a provided in this embodiment includes the first fixing part 151 and a second connection part connected to the first fixing part 151. The second connection part includes at least one first baffle 113a, at least one second baffle 114a, and a slot 115a arranged between the at least one first baffle 113a and the at least one second baffle 114a. The slot 115a extends along the second direction, for instance, and the at least one baffle 113a and the at least one second baffle 114a extend from the first fixing part 151, for instance. The first connection part of the base 110 includes a first extension part 152a which extends from the primary plate body 111, for instance, and the first extension part 152a is movably inserted into the slot 115a along the second direction. The buffer 160 provided in this embodiment covers the first extension part 152a; for instance, the buffer 160 is attached to the first extension part 152a, and the first extension part 152a of the base 110 and the buffer 160 are together inserted into the slot 115a of the connector 150a. That is, the buffer 160 is located between the at least one first baffle 113a and the first extension part 152a and between the first extension part 152a and the at least one second baffle 114a. Such an arrangement also allows the front end of the lens assembly to be well fixed to the base.

To sum up, the connector provided in one or more embodiments of the invention includes the first fixing part fixed to the lens assembly and the second connection part connected to the first connection part located at the base, and the buffer is arranged between the first connection part and the second connection part. Thereby, the vibrations received by the lens assembly may be sequentially transmitted to the first fixing part and the second connection part and then absorbed by the buffer in the slot. Accordingly, the lens assembly is able to stay steady without being shaken during the process of projecting images. As a result, the projector provided in one or more embodiments of the invention ensures favorable imaging quality and achieves the pleasant user experience.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A projector, comprising:
    a base, comprising a primary plate body and a first connection part connected to the primary plate body;
    an optical engine assembly, configured to provide an image beam;
    a lens assembly, arranged above the base and located on a transmission path of the image beam;
    a connector, comprising a first fixing part and a second connection part connected to the first fixing part, wherein the first fixing part is fixed to the lens assembly, one of the first connection part and the second connection part is a slot, and the other of the first connection part and the second connection part is movably inserted into the slot; and
    a buffer, arranged in the slot, wherein the first connection part is connected to the second connection part through the buffer.

2. The projector according to claim 1, wherein the first connection part comprises at least one first baffle arranged along a first direction, at least one second baffle, and the slot formed between the at least one first baffle and the at least one second baffle, wherein the slot extends along a second direction, the second connection part is movably inserted into the slot along the second direction, the at least one first baffle and the at least one second baffle restrict movement of the second connection part along the first direction, and the buffer is configured to be attached to the second connection part.

3. The projector according to claim 2, wherein the at least one first baffle and the at least one second baffle extend from the primary plate body, the optical engine assembly and the lens assembly are arranged above the primary plate body, and projections of the at least one first baffle and each of the at least one second baffle on a plane where the primary plate body is located are not overlapped.

4. The projector according to claim 3, wherein the number of the at least one second baffle is two, and the two projections of the second baffles on the plane where the primary plate body is located are on both sides of the projection of the at least one first baffle on the plane where the primary plate body is located.

5. The projector according to claim 3, wherein the base comprises a connection plate bent and extended from the primary plate body toward the lens assembly, and the at least one first baffle is bent and connected to the connection plate.

6. The projector according to claim 2, further comprising a fastener, wherein the first fixing part comprises an elongated hole extending along the first direction, the fastener passes through the elongated hole and is fixed to the lens assembly, and the fastener pushes against a wall surface of the first fixing part beside the elongated hole.

7. The projector according to claim 6, wherein the elongated hole is a U-shaped hole recessed from an edge of the first fixing part.

8. The projector according to claim 2, wherein the first fixing part comprises a reinforced rib.

9. The projector according to claim 2, wherein the lens assembly comprises a lens barrel and a reflector, the image beam is sequentially transmitted to the lens barrel and the reflector, and the connector is close to the reflector and far away from the lens barrel.

10. The projector according to claim 9, wherein the lens assembly comprises a housing, the housing covers the reflector and a portion of the lens barrel, and the first fixing part is fixed to the housing of the lens assembly.

11. The projector according to claim 9, further comprising at least one speaker arranged beside the reflector.

12. The projector according to claim 2, wherein the buffer comprises a first buffer and a second buffer, the first buffer is arranged between the at least one first baffle and the second connection part, and the second buffer is arranged between the at least one second baffle and the second connection part.

13. The projector according to claim 12, wherein the first buffer and the second buffer are integrally formed.

14. The projector according to claim 1, wherein the second connection part comprises at least one first baffle, at least one second baffle, and the slot formed between the at least one first baffle and the at least one second baffle, the first connection part comprises a first extension part, wherein the slot extends along a second direction, the first extension part is movably inserted into the slot along the second direction, the at least one first baffle and the at least one second baffle restrict movement of the first extension part along the first direction, and the buffer is configured to be attached to the first extension part.

* * * * *